Jan. 20, 1970     H. HUMMEL     3,490,345
LIGHT METAL PISTON

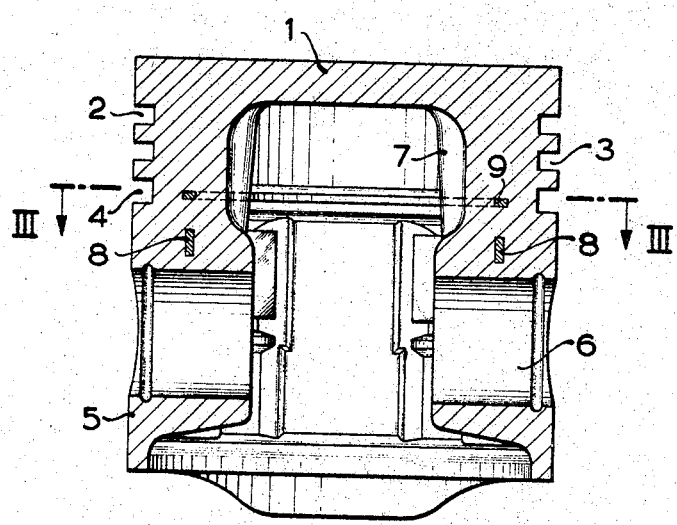
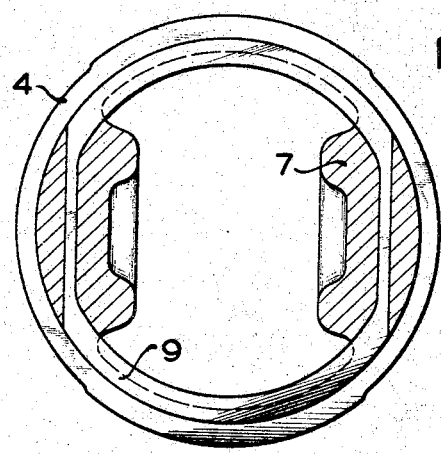

Filed April 8, 1968     2 Sheets-Sheet 2

INVENTOR
HAGEN HUMMEL
BY
Stephens, Huettig & O'Connell
ATTORNEYS

United States Patent Office 3,490,345
Patented Jan. 20, 1970

3,490,345
LIGHT METAL PISTON
Hagen Hummel, Weiler uber Heilbronn (Neckar), Germany, assignor to Mahle Komm.-Ges., Stuttgart-Bad Cannstatt, Germany
Filed Apr. 8, 1968, Ser. No. 719,599
Claims priority, application Germany, Apr. 22, 1967, M 73,712
Int. Cl. F16j 1/00
U.S. Cl. 92—229                                    1 Claim

ABSTRACT OF THE DISCLOSURE

Portions of the piston head and piston skirt are separated by a flat metal member against which the head and skirt bear but which is not welded to the piston. This, together with a flat metal insert in the piston skirt, controls the thermal expansion of the skirt while giving the piston good mechanical strength.

---

This invention relates to a light metal piston for internal combustion engines and which has inserts in the piston skirt for controlling the thermal radial expansion of the skirt. The inserts have a lower coefficient of expansion than the light metal piston.

Many forms exist using such construction. One widely used form has sheet metal inserts which are embedded in the wrist pin area of the piston and extend circumferentially from the bosses. The inserts are exposed to the interior of the skirt and form with the skirt bimetallic connecting elements whose radius of curvature becomes smaller when heated. Therefore, the skirt at these inserts does not expand radially as much as the skirt portions adjacent the wrist pins. The principal characteristic of this form is that a satisfactory controlling effect can be achieved when urging relatively small and lightweight sheet metal inserts. If the skirt whose radial expansion, due to heat, is separated from the piston head by transverse slots, then the control effect is more uniform across the entire length of the skirt.

For reasons of stability, transversely slotted pistons are not usable for highly stressed engines, such as diesel engines, so that sheet metal inserts as heretofore described are used in solid pistons and have the entire circumference of the skirt joined to the piston head by suitably choosing the size of the piston portion connecting the skirt to the head, as, for example, shown in U.S. Patent No. 2,882,107, it is also possible to obtain a satisfactory control circuit in this connection. However, it is not possible to eliminate completely the influence of the heat in the relatively rigid piston head which cannot be controlled with regard to heat expansion in the connection.

In order to avoid this disadvantage, attempts have been made to construct pistons in which the lowest ring groove in the piston ring zone of the piston head has shell or jacket-like sheet metal inserts embedded in the skirt so that the insert is covered with a relatively thin layer of light metal, which layer is separated from the piston head by the lowest ring groove. In the interior of the skirt, the insert is covered with a thicker and stronger light metal layer which is directly connected with the piston head. British Patent No. 851,849 discloses such construction, the control effect being not on the bimetallic curve but rather on the fact that the light metal layer when cold and shrunk when heated loses a part of its tension and its elastic expansion, which process overshadows the heat expansion in such a manner that it appears essentially only in a tangential direction and less in a radial direction. In this case, the connection from the piston head to the skirt at the insert can be chosen of any wall strength and therefore satisfy the requirements for mechanical strength irrespective of the control effect. However, the disadvantage remains that the heat control expansion effect is limited to the outer skirt areas which have direct communication with the shell-like control elements. In order to achieve a uniform control effect, it is thus necessary to use control elements which extend across the entire skirt length. Since, because the possibilities of obtaining an equalization of the masses is limited because the piston weight is often narrowly restricted, it is not possible in practice to provide control elements having the desired dimensions and circumferences. Consequently, the heat expansion control must be foregone in the area of the open end of the skirt, that is, exactly at the point where a close tolerance between the skirt and the cylinder is of especial significance.

U.S. Patent No. 3,007,755 also discloses a circular expansion control insert between the piston head and the skirt in which the insert separates a portion of the skirt from the head. The piston and skirt bear against the insert so that the heat expansion of the skirt is not influenced by the piston head even when great mechanical stresses are placed on it. The effect of this expansion controlling insert is limited, however, to the end of the skirt adjacent the piston head.

The object of this invention is to produce a piston construction which will satisfy the two requirements for good mechanical strength between the piston head and skirt and a uniform heat expansion control of the piston skirt while using lightweight control elements not extending over the entire skirt length.

In general, these objects are obtained by using control elements anchored or embedded in the wrist pin boss areas and circumferentially extending from the bosses, and using sheet metal inserts having a lower coefficient of expansion than the light metal piston. The inserts are exposed to the interior of the skirt and form a bimetallic coupling with the skirt. A portion of the skirt is separated from the piston head by special separating elements, preferably made of sheet metal, which when cast into the light metal piston will not weld with the piston and which elements have as large as desirable coefficients of expansion. The piston head and skirt both bear upon the separating element and have the effect that the piston and skirt do not influence each other in their radial heat expansion. The separating elements have flat surfaces against which the head and skirt bear and these flat surfaces extend perpendicular to the longitudinal axis.

Such a piston, insofar as heat expansion control is concerned, is hardly different from a piston having transverse slots. Also, pressure forces in the piston head can be absorbed as in a solid skirt piston. Initially, it would seem that this type of construction would not be practical because it is correct to think that the connection between the piston head and skirt for high speed pistons is not only subject to piston head stresses but also to a similar degree to oppositely acting centrifugal forces, which latter cannot be absorbed by inserts between the piston head and skirt. However, experience has shown that the piston of this invention has a greater strength than a piston with transverse slots without separating inserts because great centrifugal forces do not arise at high speed. Apparently this surprising result is due to the fact that, because the piston head can flex only in one direction under centrifugal force, the amplitude of the flexing and also the alternating bending stresses of the parts is greatly reduced.

The means by which the objects of the invention are obtained are described more fully with reference to the accompanying drawings in which:

FIGURE 1 is a cross-sectional view through the piston taken through the wrist pin bosses;

FIGRE 2 is a cross-sectional view through the piston taken at a right angle to FIGURE 1;

FIGURE 3 is a cross-sectional view taken on the line III—III of FIGURE 1; and

Figure 2:
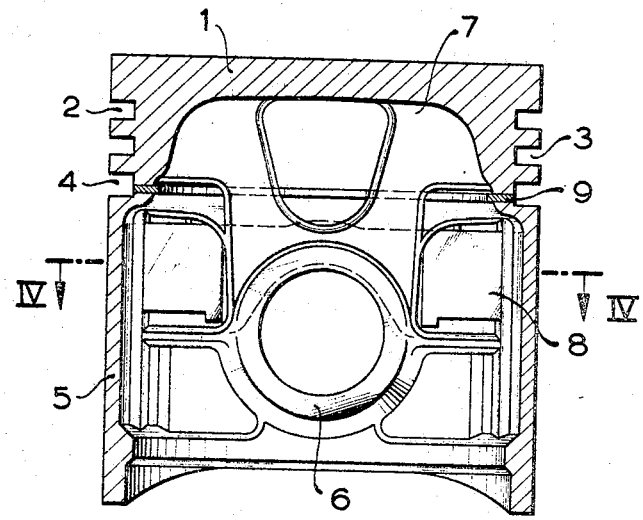
Figure 4:
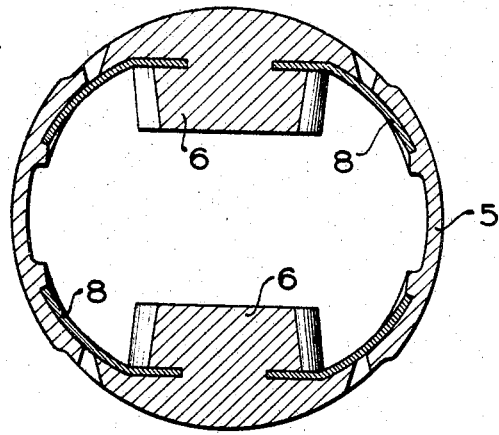
FIGURE 4 is a cross-sectional view taken on the line IV—IV of FIGURE 2.

The light metal piston body is composed of a piston head 1 having an annular piston ring zone with piston ring grooves 2, 3 and 4, a piston skirt 5 and wrist pin bosses 6 joined to the piston head by the ribs 7 which bear both on the bosses and the bottom of the piston head. Sheet metal inserts 8 have their ends anchored or embedded in the piston body within the area of the bosses 6. They extend circumferentially from the bosses against the inner wall of the skirt. In order that the inserts 8 can have a control effect not influenced by the piston head, a separating insert 9 is cast in the piston body between the head and skirt in the body portion of the adjacent groove 4. Insert 9 is substantially of circular shape and is embedded in the piston body above the wrist pin bosses and entirely separates the head and skirt in the region between the bosses. Insert 9 has flat surfaces which extend perpendicular to the longitudinal axis of the piston. Thus the light metal head and skirt are effectively separated from each other. Each can radially expand independently from the other. However, each bears upon the separating insert 9.

Having now described the means by which the objects of the invention are obtained, I claim:

1. In a light metal piston comprising a piston head including a piston ring zone, a skirt joined to said head, wrist pin bosses in said skirt, metal inserts within said skirt, said metal inserts having portions embedded in said wrist pin bosses and portions exposed to the interior of said skirt and having a lower coefficient of heat expansion than the light metal of said piston for forming a bimetallic connection therewith, the improvement comprising a flat curved insert between said piston head and said skirt and embedded in the piston body above the wrist pin bosses, said curved insert separating said head from said skirt between the wrist pin bosses and not being welded to the piston, and the flat surfaces of said curved insert being directed perpendicular to the longitudinal axis of said piston.

References Cited

UNITED STATES PATENTS

| 2,795,468 | 6/1957 | Venner et al. | 92—229 |
| 2,874,011 | 2/1959 | Peterson et al. | 92—229 |
| 3,007,755 | 11/1961 | Daub | 92—229 |
| 3,434,398 | 3/1969 | Gessinger et al. | 92—228 |

CARROLL B. DORITY, Jr., Primary Examiner

U.S. Cl. X.R.

92—228